No. 792,085. Patented June 13, 1905.

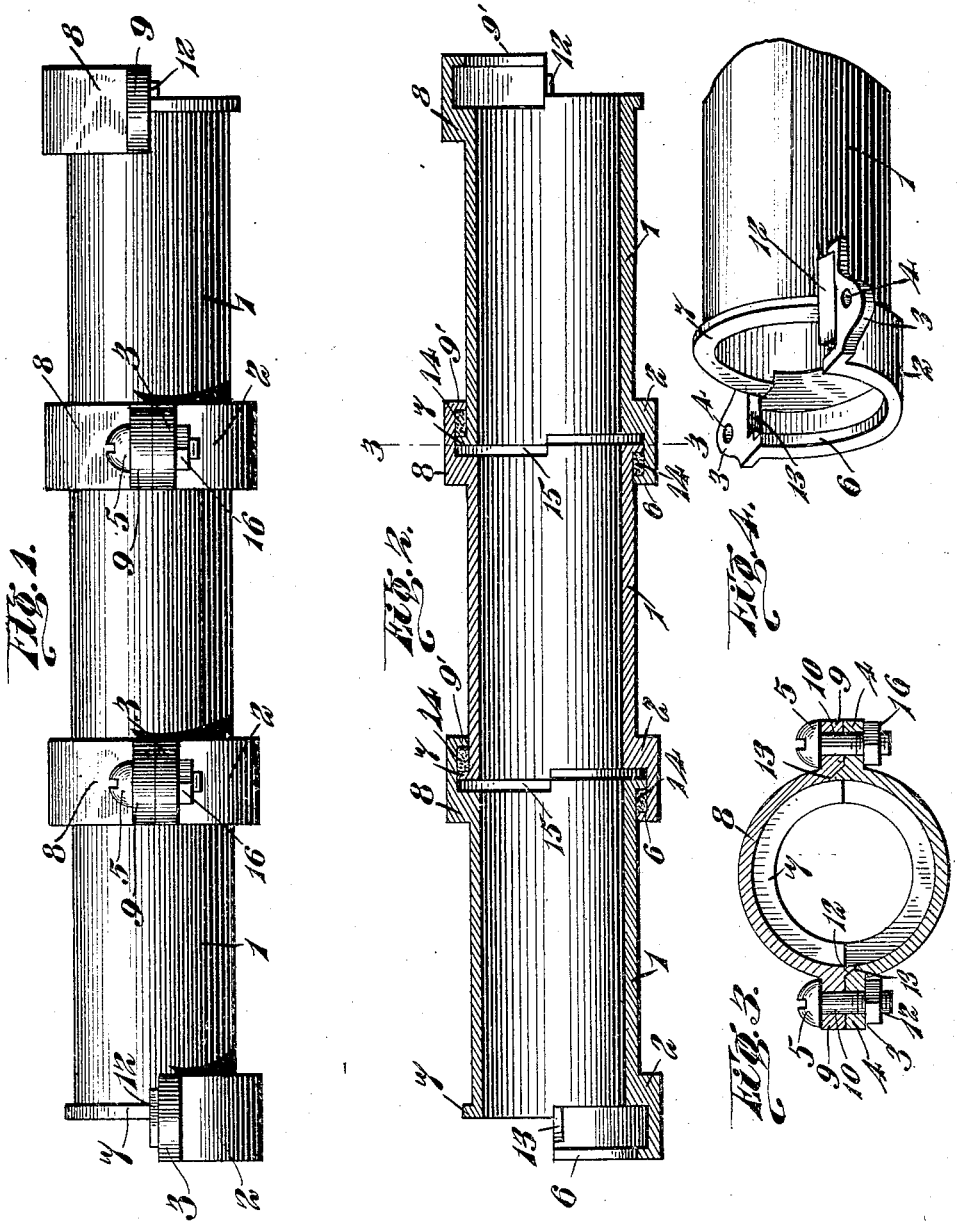

UNITED STATES PATENT OFFICE.

HENRY STUTTLE, OF BATAVIA, ILLINOIS.

PIPE-COUPLING.

SPECIFICATION forming part of Letters Patent No. 792,085, dated June 13, 1905.

Application filed June 27, 1904. Serial No. 214,404.

*To all whom it may concern:*

Be it known that I, HENRY STUTTLE, a citizen of the United States, residing at Batavia, in the county of Kane and State of Illinois, have invented certain new and useful Improvements in Pipe-Couplings; and I do declare the following to be a full, clear, and exact description of the invention, such as will enable others skilled in the art to which it appertains to make and use the same.

This invention relates to improvements on pipe couplings or joints.

The object of the invention is to provide a coupling or joint for sections of pipe whereby one section of the same may be readily removed without in any manner disturbing the rest of the sections.

Another object is to provide a pipe coupling or joint formed integral with the pipe-sections, one half of the coupling being arranged on one end of a pipe-section and the other half being arranged on the other end of the next adjoining section.

A further object is to provide a pipe-joint which will be simple in construction, readily put together and taken apart, and which may easily and securely be packed to prevent leakage.

With these and other objects in view the invention consists of certain novel features of construction, combination, and arrangement of parts, as will be more fully described, and particularly pointed out in the appended claims.

In the accompanying drawings, Figure 1 is a side elevation of three pipe-sections coupled together in accordance with the invention. Fig. 2 is a longitudinal vertical sectional view through the same. Fig. 3 is a transverse vertical sectional view, and Fig. 4 is a perspective view, of one of the sections of pipe.

Referring more particularly to the drawings, 1 denotes a pipe-section, on one end of which is arranged an enlarged semicircular extension 2, which is cast integral with the section and projects beyond the same to form one-half of a socket or coupling. At the ends of said semicircular extension are formed centrally-disposed laterally-projecting ears or lugs 3, in which are formed apertures 4 for the reception of bolts 5. On the outer edge of the extension 2 is formed an inwardly-projecting flange 6. On the end of that portion of the pipe-section not provided with the extension is formed an outwardly-projecting semi-annular flange 7.

On the end of the pipe-section opposite to that having the extension 2 is arranged an integrally-formed semicircular extension 8, which is similar in construction to the extension 2, but is formed on the opposite side of the pipe-section from that on which said extension 2 is formed.

The extension 8 has formed thereon lugs 9, which are similar to the lugs 3, and are provided with bolt-holes 10. The extension 8 is also provided with a semi-annular flange 9.

On one end of each of the semicircular extensions is formed a wedge-shaped or triangular extension which forms a tongue 12, and the opposite end of said extension is beveled or recessed, as at 13. Said tongues and recesses are formed on opposite sides of the ends of the extensions on each section of pipe, so that when said pipe-sections are brought together the tongues on one end of the extension will engage the recess in the adjacent end of the extension on the adjoining section of pipe.

Between the meeting ends of the sections of pipe are disposed packing-rings 14, which, together with the lap formed by the tongue 12 entering the recess 13, will form a fluid-tight joint.

In the end of each section a semicircular recess 15 is formed, which affords sufficient space to permit the removal of one of the intermediate sections when found necessary.

In assembling the sections of pipe the ends of the same are brought together, so that the semicircular extensions of one section will engage the flanged end of the next adjoining section, the lugs 3 and 9 coming together, with the apertures or bolt-holes of the same in alinement. Through said alined holes are passed bolts 15, on which are screwed nuts 16, thereby fastening said sections together.

When it is desired to remove any of the sections of pipe, all that is necessary is to remove the nuts and bolts 15 and 16, when the section desired may be lifted out from between the two adjacent sections without disturbing the same or moving any of the other pipe-sections.

To illustrate the manner of removing an intermediate section of the pipe, reference may be had to Fig. 2 of the drawings. When extension 8 is raised, the flange 7 opposite said extension may move backward within the semicircular recess 15 until the upper end of the section is cleared by a movement in the arc of a circle.

It will be understood that while I have simply shown the joint or coupling in connection with straight pipe it may with equal advantage be used on elbows, T's, and all other forms of pipe construction and in connection with pipes made of any material used for making pipe.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A pipe-coupling consisting of two counterpart members each of which comprises a semicircular extension formed integrally with and on the ends of a pipe-section, and inwardly-extending flanges on said extensions, a semicircular recess in the end of each section, the coupling member on the end of one section being adapted to coincide and engage with that on the opposite side of the end of the adjoining section, thereby forming a complete coupling which will permit any of said sections to be removed without disturbing the rest of the pipe, and lugs whereby said couplings are removably connected together, substantially as described.

2. In a pipe-line made up of sections, a complete integral coupling consisting of a plurality of members, each of said members consisting of an enlarged semicircular extension formed on each end, said extensions being arranged on opposite ends, an inwardly-projecting semicircular flange formed on said extensions, a semicircular recess in the end of the section, laterally-projecting apertured ears or lugs formed on the ends of the sections and an outwardly-projecting semicircular flange formed on the plain side of the end of said pipe-section, substantially as described.

In testimony whereof I have hereunto set my hand in presence of two subscribing witnesses.

HENRY STUTTLE.

Witnesses:
 KATHERINE O'CONNOR,
 E. S. SMITH.